US005726593A

United States Patent [19]

Ruuskanen

[11] Patent Number: 5,726,593

[45] Date of Patent: Mar. 10, 1998

[54] METHOD AND CIRCUIT FOR SWITCHING BETWEEN A PAIR OF ASYNCHRONOUS CLOCK SIGNALS

[75] Inventor: Markku Ruuskanen, Porvoo, Finland

[73] Assignee: Nokia Telecommunications Oy, Espoo, Finland

[21] Appl. No.: 755,023

[22] Filed: Nov. 22, 1996

Related U.S. Application Data

[63] Continuation of Ser. No. 424,410, Apr. 26, 1995, abandoned.

[30] Foreign Application Priority Data

Oct. 27, 1992 [FI] Finland .................................. 924870

[51] Int. Cl.$^6$ .................................................. H03K 17/00

[52] U.S. Cl. ............................ 327/99; 327/292; 327/298; 327/407

[58] Field of Search .............................. 327/407, 99, 176, 327/291, 292, 298

[56] References Cited

U.S. PATENT DOCUMENTS

| | | | |
|---|---|---|---|
| 4,691,126 | 9/1987 | Splett et al. | 327/292 |
| 4,748,417 | 5/1988 | Spengler | 328/72 |
| 4,839,855 | 6/1989 | Van Driel | 327/292 |
| 5,031,180 | 7/1991 | McIver et al. | 327/292 |
| 5,155,380 | 10/1992 | Hwang et al. | 307/269 |
| 5,197,126 | 3/1993 | Harrell | 395/200 |
| 5,231,636 | 7/1993 | Rasmussen | 370/100.1 |

FOREIGN PATENT DOCUMENTS

| | | |
|---|---|---|
| 0254406 | 1/1988 | European Pat. Off. . |
| 2181025 | 4/1987 | United Kingdom . |

*Primary Examiner*—Timothy R. Callahan
*Assistant Examiner*—Kenneth B. Wells
*Attorney, Agent, or Firm*—Cushman Darby & Cushman Intellectual Property Group of Pillsbury Madison & Sutro LLP

[57] ABSTRACT

A method and circuit in which one of at least two asynchronous constant frequency input clock signals is selected for being used as an output clock signal by use of a separate selection signal for providing redundancy for an asynchronous clock signal.

13 Claims, 2 Drawing Sheets

OUTPUT CLOCK SIGNAL
MC
122
116
6
3a
3b
M1 122a
S1 122b
M2 122c
122d
S2
S1
118
119
120
121
S2
108
110
1b
2b
5
Vcc
100
1a
2a
7
9
113
112
4a
MS
10
115
114
4b
CLOCK SIGNAL M1
102
CLOCK SELECTION SIGNAL MS
104
CLOCK SIGNAL M2
106

METHOD AND CIRCUIT FOR SWITCHING BETWEEN A PAIR OF ASYNCHRONOUS CLOCK SIGNALS

This is a continuation of application Ser. No. 08/424,410 filed on Apr. 26, 1995, now abandoned.

BACKGROUND OF THE INVENTION

The invention relates generally to a method in which one of at least two asynchronous input clock signals is selected for being used as an output clock signal by means of a separate selection signal. More particularly, the invention relates to a method for providing redundancy for an asynchronous clock signal.

When redundant asynchronous clock signals are used, a random spurious pulse appears in the output clock signal in connection with a change of the clock signal to be used, which pulse may cause malfunctions of the device using the clock. Due to these disturbances, transmission errors occur in the traffic to be transmitted in a digital telephone exchange using the changeover, as well as unnecessary alarms in the clock controlling units.

A known method of controlling the change procedure of a clock signal to be used is to generate the clock signal independently and to lock the phase of the generated signal to the phase of a selected reference signal. Implementation of a phase-lock is, however, complicated and, in general, the operation thereof has to be controlled separately.

The object of this invention is to provide a circuit, by means of which one of asynchronous input clock signals may be switched to the output as a response to a clock selection signal in a simple manner without disturbances.

SUMMARY OF THE INVENTION

Selection is performed by setting the output clock signal at the edge of the used input clock signal to a constant state and that an input clock signal selected to be used is activated to constitute the output clock signal at the moment at least the second pulse edge of the selected input clock signal appears counted from the moment at which the output clock signal is set to the constant state.

Advantages of the method according to the invention are an undisturbed switching of either of the two input clock signals to the output of the circuit and a simple method of implementation. The other preferred embodiments of the invention are characterized in what has been set forth below in the claims.

BRIEF DESCRIPTION OF DRAWING

In the following, the invention will be explained in greater detail by means of an example referring to the attached drawings, in which.

DESCRIPTION OF THE PREFERRED EMBODIMENTS

Figure 1:
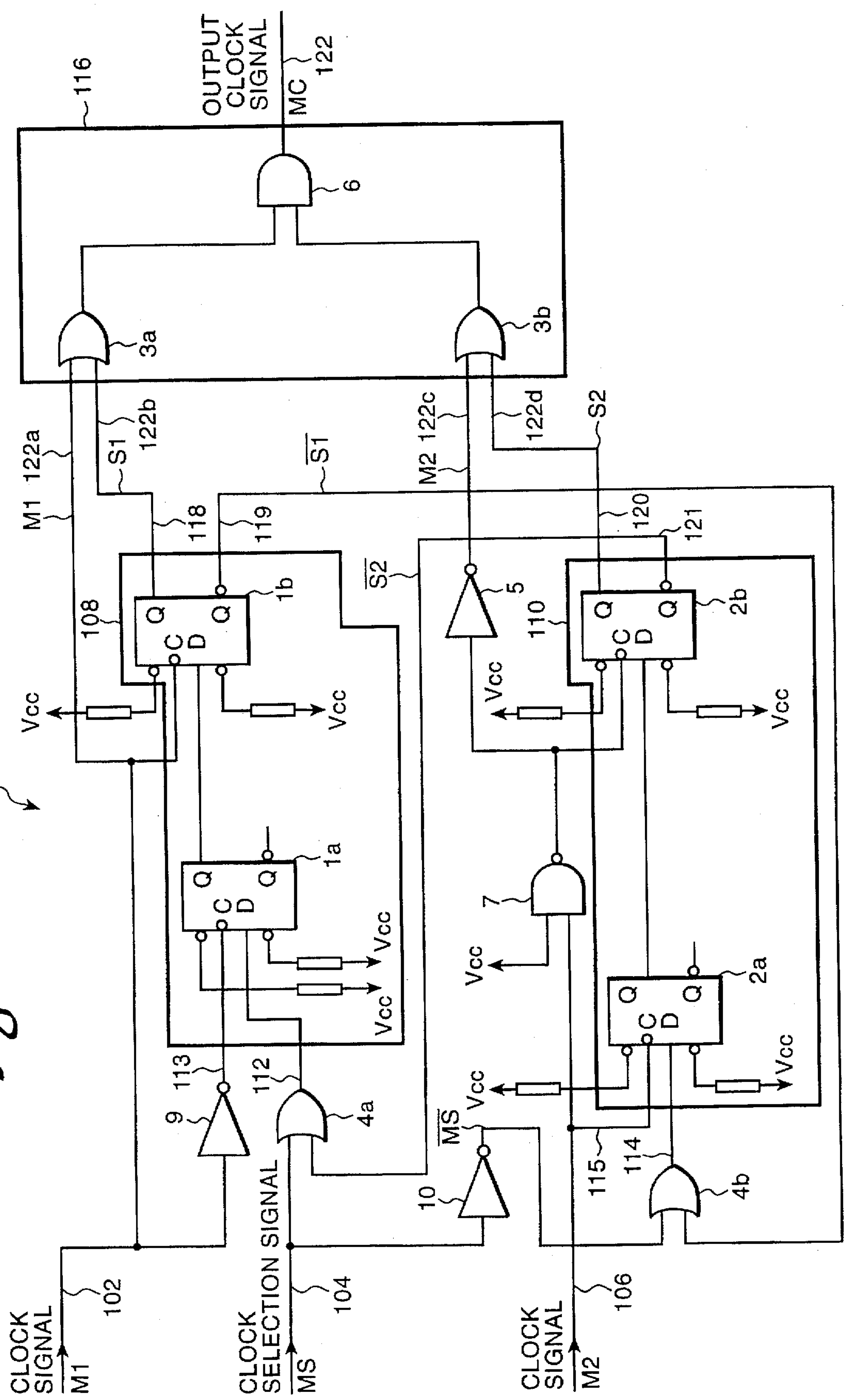
FIG. 1 shows a circuit diagram of a switching circuit according to the invention.

Referring now to the drawings in greater detail, FIG. 1 shows a changeover circuit 100 comprising a plurality of inputs, including a first clock signal input 102 which receives a first clock signal M1, a second clock signal input 102 which receives a second clock signal 106, and a selection signal input 104 which receives a selection signal MS. The changeover circuit 100 further includes a first sampling circuit 108, a second sampling circuit 110, and an output clock signal circuit 116. First sampling circuit 108 comprises a first sampling input 112, a first clock input 113, a first selection signal output 118, and a first inverse selection signal output 119. Second sampling circuit 110 comprises a second sampling input 114, a second clock input 115, a second selection signal output 120, and a second inverse selection signal output 121. Output clock signal circuit 116 comprises a plurality of inputs 122*a*–*122 d*, and an output 122 at which an output clock signal MC is produced.

First clock signal input 102 is connected, via an inverter 9, to first clock input 113 of first sampling circuit 108. First clock signal input 102 is also connected directly to input 122*a* of output clock signal circuit 116. Second clock input signal 106 is connected directly to second clock input 115 of second sampling circuit 110, and is further connected to input 122*c* of output clock signal circuit 116. A NAND gate 7 and an inverter 5 are placed in series between second clock signal input 106 and input 122*c*.

Selection signal input 104 is connected, indirectly, to the first and second sampling inputs 112, 114 of first and second sampling circuits 108,110. More specifically, selection signal input 104 is connected to a first input of an OR gate 4*a*, the output of which is connected directly to first sampling input 112. Selection signal input 104 is connected to second sampling input 114 via an inverter 10 connected in series with an OR gate 4*b*. More specifically, selection signal input 104 is connected to an input side of an inverter 10, the output of which is connected to a first input of OR gate 4*b*. The output of OR gate 4*b* is connected directly to second sampling input 114.

The second input of OR gate 4*a* is connected directly to second inverted selection signal output 121 of second sampling circuit 110, and the second input of OR gate 4*b* is connected directly to first inverse selection signal output 119 of first sampling circuit 108.

First sampling circuit 108 comprises first and second D flip-flops 1*a*, 1*b*, connected in tandem. The first D flip-flop comprises first C, D, Q and inverse Q terminals, and the second D flip-flop comprises second C, D, Q, and inverse Q terminals. First clock signal input 102 is connected directly to the second C terminal and is connected, through inverter 9, to first clock input 113 which is directly connected to the first C terminal of first D-flip-flop 1*a*. The first Q terminal is connected to the second D terminal, and the second Q terminal is connected to the second input 122*b* of output clock signal circuit 116. The second inverse Q terminal is connected to the second input of OR gate 4*a*.

OR gate 4*b* serves as an override circuit, by overriding input of the clock selection signal MS to first sampling circuit 108 when a "1" signal level is the second input of OR gate 4*a*.

Second sampling circuit 110 comprises third and fourth D-flip-flops 2*a*, 2*b* connected in tandem. Third D-flip-flop 2*a* comprises third C, D, Q and inverse Q terminals, and fourth D-flip-flop 2*b* comprises fourth C, D, Q and inverse Q terminals. Second clock signal input 106 is connected to the third C terminal and to an inverter (NAND gate 7) which is connected to the fourth C terminal. The third Q terminal is connected to the fourth D terminal, and the fourth Q terminal is connected to a third input 122*d* of output clock signal circuit 116. The fourth inverse Q terminal is connected to the second input of OR gate 4*a*.

OR gate 4*a* serves as a second override circuit, by overriding the input of the inverted clock selection signal MS to second sampling circuit 110 when a "1" signal level is at the second input of OR gate 4*b*.

Output clock signal circuit 116 may comprise a first OR gate 3*a* and a second OR gate 3*b*. First OR gate 3*a* comprises first and second inputs 122*a*, 122*b*, and second OR gate 3*b* comprises third and fourth inputs 122*c* and 122*d*. Output clock signal circuit 116 further comprises a AND gate 6 which receives each of the outputs of the first and second OR gates 3*a*, 3*b*.

First sampling circuit 108 samples at its first sampling input 112 a first input signal. The first input signal comprises a first representative signal representative of the selection signal MS when in a default state and comprises an override signal when in an override state. OR gate 4*a* serves as an override circuit since when it receives at its second input a high signal level, its output will be high regardless of the level of selection signal MS. In the illustrated embodiment, the first representative signal comprises the selection signal MS.

Second sampling circuit 110 samples at its second sampling input 114 a second input signal. The second input signal comprises a second representative signal representative of the selection signal MS while in a default state and comprises an override signal while in an override state. In the illustrated embodiment, the second representative signal comprises an inversion of the clock selection signal MS which is output by inverter 10.

As noted previously, first sampling circuit 108 comprises first and second D-flip-flops 1*a*, 1*b* connected in tandem. The D-flip-flops 1*a*, 1*b* of the illustrated embodiment comprise positive edge-triggered D-flip-flops, and their tandem connection serves to detect two predetermined first edges of the first clock signal M1, and to latch the first selection signal S1 at first selection signal output 118 to the first input signal (received at first sampling input 112) after the two predetermined first edges have been detected.

Similarly, second sampling circuit 110 comprises first and second D-flip-flops 2*a*, 2*b*, connected in tandem. In the illustrated embodiment, each of those D-flip-flops may comprise a positive edge-triggered D-flip-flop, and accordingly their tandem connection detects two predetermined second edges of the second clock signal M2 and latch the second selection signal S2 at second selection signal output 120 to the second input signal (received at second sampling input 114) after the two predetermined second edges have been detected.

The signals input to the circuit are asynchronous clock signals M1 and M2, as well as a clock selection signal MS. The output signal from the circuit is a selected output clock signal MC.

The clock signal M1 is applied to an input of an inverter 9. The inverter 9 provides an inverted version M1 of the clock signal M1 to a clock input of a D-flip-flop 1*a*. The clock signal M1 is also applied to a clock input of a D-flip-flop 1*b* as well as to an input of an OR-gate 3*a*. A sampled selection signal S1 is applied to another input of the OR-gate 3*a* from an output of the D-flip-flop 1*b*. Due to the logical OR operation, the logical state of the output of OR-gate 3*a* will follow the logical state of the clock signal M1 when the selection signal S1 is in a logical state "0". In other words the clock signal M1 is selected and passed through the OR-gate 3*a* to an input of an AND-gate 6 when the selection signal S1="0". On the other hand, when the selection signal S1 is in a logical state "1", the output of the OR-gate 3*a* is permanently "1", regardless of the state of the clock signal M1. In other words, the clock signal M1 is not selected and passed through the OR-gate 3*a* to an input of an AND-gate 6, when the selection signal S1="1".

The clock signal M2 is applied to a clock input of a D flip-flop 2*a* and to an input of a NAND-gate 7. The other input of the NAND-gate 7 is connected to a supply voltage Vcc, i.e it is permanently in a logical state "1". As a consequence, the NAND-gate 7 operates as an inverter which provides an inverted version M2 of clock signal M2 to a clock input of a D-flip-flop 2*b* as well as to an input of an inverter 5. The output signal of the inverter 5 is again the original clock signal M2 which is applied to an input of an OR-gate 3*b*. A sampled selection signal S2 is applied to another input of the OR-gate 3*b* from an output of the D-flip-flop 2*b*. Due to the logical OR operation, the logical state of the output of OR-gate 3*b* will follow the logical state of the clock signal M2 when the selection signal S2 is in a logical state "0". In other words the clock signal M2 is selected and passed through the OR-gate 3*b* to an input of an AND-gate 6 when the selection signal S2="0". On the other hand, when the selection signal S2 is in a logical state "1", the output of the OR-gate 3*b*, is permanently "1", regardless the state of the clock signal M2. In other words, the clock signal M2 is not selected and passed through the OR-gate 3*b* to an input of an AND-gate 6 when the selection signal S2="1".

As described above, the output signals of the OR-gates 3*a* and 3*b* are applied to the input of the AND-gate 6. Since the output signal from the "nonselected" one of the OR-gates 3*a* and *b* is in a logical state "1", the logical AND operation results in that the logical state of the output signal of the AND-gate 6, i.e. the output clock signal MC, follows the logical state of the respective clock signal M1 or M2.

An asynchronous clock selection signal MS and the inversion thereof are sampled by mutually asynchronous clock signals M1 and M2. The selection signal samples are taken by two series connected and sequentially switched D-flip-flop circuits 1*a*, 1*b* and 2*a*, 2*b*, respectively, at the rising and falling edge of the clock signals M1 and M2 in order to eliminate an interference peak from the resulting sampled selection signals S1 and S2, which are the outputs from D-flip-flops 1*b* and 2*b*, respectively. This will be further described below.

The D-flip-flops illustrated in FIG. 1 are D-type positive edged-triggered flip-flops. Such flip-flops operate so that when the input clock pulse makes a positive-going transition, the value of D is transferred to Q. Otherwise, when the clock input does not make a positive-going transition, changes in D do not affect Q. $\overline{Q}$ is simply the inverted value of the output at Q.

The clock selection signal MS is applied to an input of an OR-gate 4*a* and to an inverter 10. The inverted selection signal S2 from the inverted output $\overline{Q}$ of the D-flip-flop 2*b* is applied to the other input of OR-gate 4*a*. Due to the logical OR operation, the logical state of the output of OR-gate 4*a* will follow the logical state of the selection signal MS when the inverted selection signal $\overline{S2}$ is in a logical state "0". In other words the selection signal MS is passed through the OR-gate 4*a* to the data input D of the D-flip-flop 1*a*, when the inverted selection signal $\overline{S2}$="0". On the other hand, when the inverted selection signal $\overline{S2}$ is "1", the output of the OR-gate 4*a* is permanently "1", regardless the state of the selection signal MS. In other words, the selection signal MS is not passed through the OR-gate 4*a*.

The inverter 10 provides an inverted version MS of the selection signal MS to an input of an OR-gate 4*b*. The inverted selection signal $\overline{S1}$ from the inverted output of the D-flip-flop 1b is applied to another input of the OR-gate 4b. Due to the logical OR operation, the logical state of the output of OR-gate 4b will follow the logical state of the selection signal MS, when the inverted selection signal $\overline{S1}$ is in a logical state "0". In other words the selection signal MS is passed through the OR-gate 4b to the data input D of D-flip-flop 2a, when the selection signal S1="0". On the other hand, when the inverted selection signal $\overline{S1}$ is "1", the output of the OR-gate 4b is permanently "1", regardless the state of the selection signal MS. In other words, the selection signal MS is not passed through the OR-gate 4b.

The D-flip-flop 1a is controlled by the output signal of the inverter 9, i.e. the inverted clock signal $\overline{M1}$. D-flip-flop 1a is a D-type positive edge triggered flip-flop. Thus, as noted above, the logical state in the data input D of D-flip-flop 1a is transferred to output Q of the D-flip-flop 1a at the rising edge of the inverted clock signal M1 (which corresponds to the falling edge of the clock signal M1). In other words, the output signal of the OR-gate 4a (the selection signal MS when S1 is 0) is sampled by D-flip-flop 1a under the control of clock signal M1. The output signal of D-flip-flop 1a is applied to a data input D of the D-flip-flop 1b. The clock signal M1 is applied to the clock input of the D-flip-flop 1b. Thus, the logical state in the output of D-flip-flop 1a is transferred to the output of the D-flip-flop 1b at the rising edge of the clock signal M1.

The D-flip-flop 2a is controlled by the clock signal M2. The logical state in the data input D of D-flip-flop 2a is transferred to output Q of the D-flip-flop 2a at the rising edge of the clock signal M2. In other words, the output signal (the selection signal MS) of the OR-gate 4b is sampled by D-flip-flop 2a under control of clock signal M2. The output signal of D-flip-flop 2a is applied to a data input of the D-flip-flop 2b. The inverted clock signal $\overline{M2}$ output from the inverter 7 is applied to the clock input of the D-flip-flop 2b. Thus, the logical state in the output of D-flip-flop 1a is transferred to the output of the D-flip-flop 1b at the rising edge of the inverted clock signal $\overline{M2}$ (the falling edge of the clock signal M2).

As a result, the output clock signal MC at the output of the AND-gate 6 will follow the input clock signal M1, when the selection signal MS is "0", and the input clock signal M1, when the selection signal MS is "1".

Let us assume that the clock signal M1 is currently selected as the output clock signal MC, i.e MS="1". This means that the selection signal $\overline{S1}$ is "0", and the selection signal S2 is "1". Then the state of selection signal MS changes into "0". The inversion of the selection signal $\overline{MS}$ is sampled through an OR gate 4b by the clock signal M2 which will be selected as the output clock signal MC. The inversion of the selection signal $\overline{S1}$ sampled by the clock signal M1 is led to one input of the OR gate 4b. Thanks to this feedback signal, the selection signal S2 from the D-flip-flop 2b will not change to the "0"state and the clock signal M2 will not be passed through the OR-gate 3b until after the clock signal MC is steadily in the logical state "1", i.e. the inverted signal $\overline{S1}$ is "0". More particularly, the inverted selection signal $\overline{S1}$="1" in the input of the OR-gate 4b allows the inverted selection signal $\overline{MS}$="1" to pass through the OR-gate 4b to the D-flip-flop 2a to be sampled at the next rising edge of the clock signal M2. Thereafter the output of the D-flip-flop 2a will be sampled by the D-flip-flop 2b at the next falling edge of the clock signal M2, thus resulting in a selection signal S2="1". In other words, the clock signal M2 will be passed through OR-gate 3b at the first suitable falling edge of the clock signal M2.

Thus, according to the invention, the two sampled selection signals S1 and S2 are generated from the selection signal MS at successive edges (rising and falling edges) of the two input clock signals M1 and M2. The first sampled selection signal is fed back to the circuitry 4b, 2a, 2b which is sampling by the second clock signal M2, and the second sampled selection signal S2 is fed back to the circuitry 4a, 1a, 1b which is sampled by the first clock signal Mi. When the second clock signal M2 is to be selected, the output clock signal MC is passivated, i.e. left in a constant state by the first selection signal. On account of the feedback, the second clock signal M2 cannot be selected until the change of state of the first selection signal has been sampled by the second clock signal M2, by means the OR-gate 4b.

Figure 2:
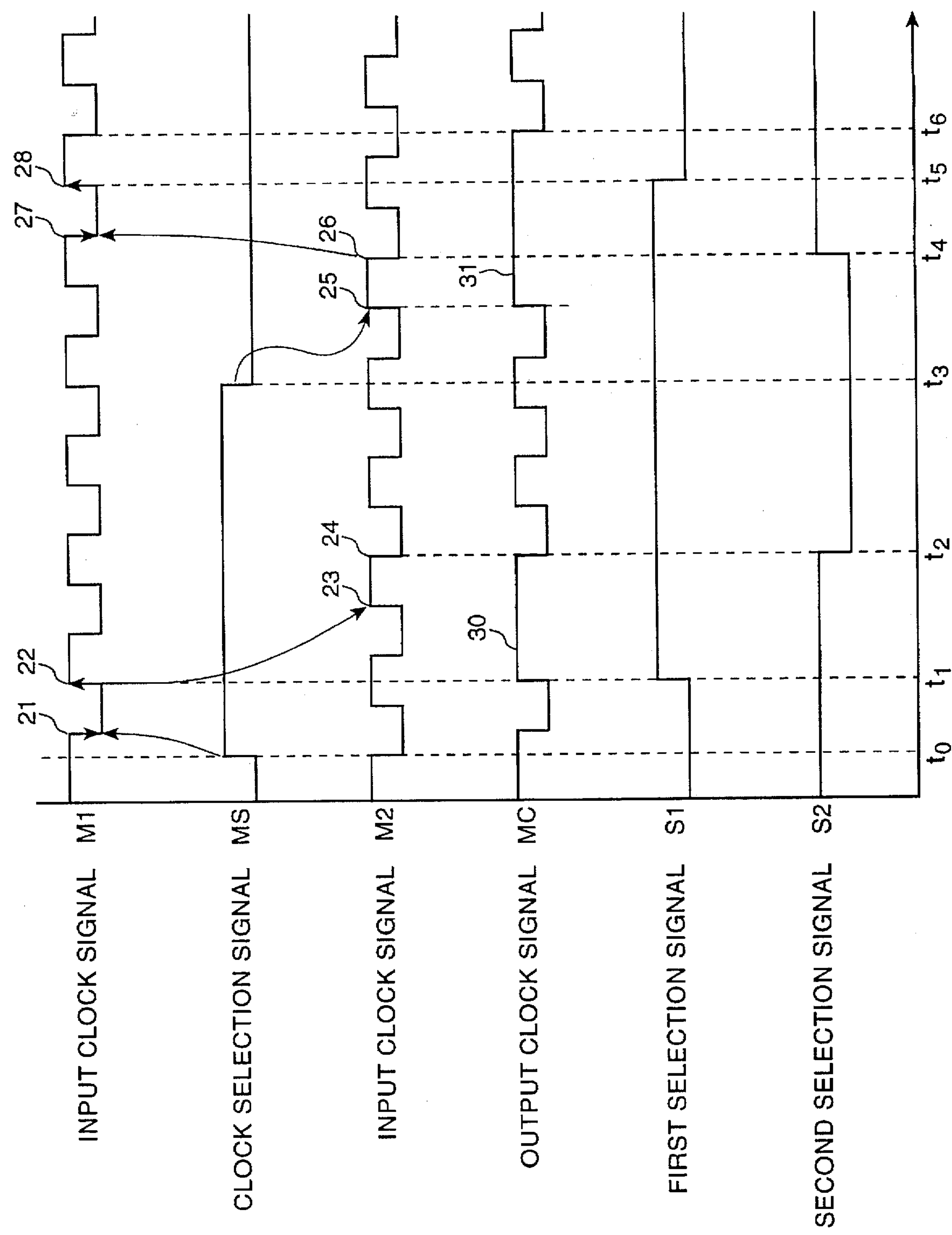
FIG. 2 shows a timing diagram of the circuit.

The operation of the circuit is further illustrated by a timing diagram shown in FIG. 2.

In the initial situation of the timing diagram of FIG. 2 (i.e prior to the moment t0), the clock signal MS is in the "0"state and the input clock signal M1 has been selected to be used as the output clock signal MC (i.e. the clock signal MC follows the clock signal M1, as described above). With the change of the selection signal MS to the state "1" (at the moment t0), the selection signal the output of the D-flip-flop 1b also changes to the state "1" at the moment t1 after the first pair of falling and rising edges of the signal M1, the i.e. edges 21 and 22. The output of the OR gate 3a and the output clock signal MC to be used, selected by the AND circuit 6, also remain in the state "1" after t1. As described above with reference to FIG. 1, the state "1" of the selection signal means that the inverted selection signal $\overline{S1}$ is "0" at the input of the OR-gate 4b. In accordance with the principles described above with reference to FIG. 1, $\overline{S1}$="0" allows the sampling of the selection signal MS by the D-flip-flops 2a and 2b at the following rising and falling edges 23,24 shown in the FIG. 2. As a consequence, at the moment t2, the selection signal S2 will have state "0", thereby allowing the output clock signal to follow the clock signal M1, i.e. to change to state "0". Thus, the circuit according to the invention prevents pulse lengths shorter than those of the input clock signals M1 and M2 from occurring in the selected clock signal MC.

More particularly, when the clock signal M2 is selected at the moment t0, there will be a prolonged "1" pulse 30 in the clock signal MC between t1 and t2. This prolongation depends on the phase difference of the input clock signals M1 and M2 and is between zero and the duration of one period of the clock signal M2.

When the clock signal M1 is selected as indicated by a reference numeral 23 in FIG. 2), the circuit operates on a corresponding principle. Firstly, the state of the selection signal MS changes from "1" to "0"at the moment t3. Thereafter, the rising and falling edges 25, 26 of the clock signal M2 follow and the selection signal MS is sampled by D-flip-flops 2a and 2b, resulting in the state "1" of the selection signal S2 The state of the inverted selection signal S2 is then "0", allowing the sampling of the selection signal MS by the D-flip-flops 1a and 1b at the falling and rising edges 27,28 of the clock signal Mi. Thus, at the moment t5 the output clock signal starts to follow the clock signal and, at the moment t6, changes to state "0". Here, the clock signal MC also shows a prolonged "1" pulse 31. The length of this prolongation is between the duration of one period of the clock signal M2 and the double value thereof.

A propagation delay of the inverter 5 is longer than the propagation delay of the D-flip-flop 2b. This prevents a spurious pulse at the output of the OR gate 3b when the clock signal M1 is selected. Without this arrangement, the spurious pulse would occur at a moment when a logical state "1" is clocked for the first time at the output of the D-flip-flop 2b.

For one skilled in the art it is clear that the various embodiments of the invention are not restricted to the above example, but they may vary within the scope of the claims presented below.

I claim:

1. An apparatus for producing an output clock signal, said apparatus comprising:

a first clock signal input for receiving a first clock signal having a given pulse width;

a second clock signal input for receiving a second clock signal having said given pulse width;

a selection signal input for receiving a selection signal, said first and second clock signals and said selection signal being asynchronous in relation to each other;

a first sampling circuit for sampling a first input signal, said input signal comprising a first representative signal representative of said selection signal while in a default state and comprising an override signal while in an override state, the output of said first sampling circuit comprising a first selection signal;

a second sampling circuit for sampling a second input signal, said second input signal comprising a second representative signal representative of said selection signal while in a default state and comprising an override signal while in an override state, the output of said second sampling circuit comprising a second selection signal;

said first sampling circuit comprising circuitry for detecting at least two predetermined first edges of said first clock signal and for latching said first selection signal to said first input signal after said at least two predetermined first edges are detected;

said second sampling circuit comprising circuitry for detecting at least two predetermined second edges of said second clock signal and for latching said second selection signal to said second input signal after said at least two predetermined second edges are detected;

a first override circuit for switching said first sampling circuit from the respective said default state to an override state when said first selection signal has an ON signal level;

a second override circuit for switching said second sampling circuit from the respective said default state to an override state when said second selection signal has an ON signal level; and an output clock signal circuit for outputting as said output clock signal one of said first and second clock signals when one of said first and second selection signals has an ON level and otherwise outputting as said output clock signal a signal level which is prolongated with respect to said given pulse width.

2. The apparatus according to claim 1, wherein said first representative signal comprises said selection signal, and wherein said second representative signal comprises an inverse of said selection signal.

3. The apparatus according to claim 1, wherein an ON signal level of said first selection signal and of said second selection signal is a low signal level.

4. The apparatus according to claim 1, said output clock signal circuit comprising:

a first gate for outputting said first clock signal when said first selection signal has an ON signal level and for outputting an OFF signal level when said first selection signal has an OFF signal level;

a second gate for outputting said second clock signal when said second selection signal has an ON signal level and for outputting an OFF signal level when said second selection signal has an OFF signal level; and an output circuit receiving the outputs of said first and second gates.

5. The apparatus according to claim 4, wherein said output circuit comprises an AND gate.

6. The apparatus according to claim 5, said first sampling circuit comprising first and second D flip-flops connected in tandem;

said first D flip-flop comprising first C, D and Q terminals, and said second D flip-flop comprising second C, D, Q terminals and an inverse Q terminal;

said second clock signal being connected to said third C terminal and to an inverter which is connected to said fourth C terminal, said third Q terminal being connected to said fourth D terminal, said fourth Q terminal being connected to an input of said second gate, and said fourth inverse Q terminal being connected to an input of said first override circuit.

7. The apparatus according to claim 6, wherein said second override circuit comprises a first OR gate having an input for receiving an inverted version of said selection signal and an input for receiving said second inverse Q terminal which outputs an inverted version of said first selection signal; and wherein said first override circuit comprises a second OR gate having an input for receiving said selection signal and an input for receiving said fourth inverse Q terminal which outputs an inverted version of said second selection signal.

8. A method for producing an output clock signal, said method comprising:

receiving a first clock signal having a given pulse width;

receiving a second clock signal having said given pulse width;

receiving a selection signal, said first and second clock signals and said selection signal being asynchronous in relation to each other;

sampling with a first sampling circuit a first input signal, said first input signal comprising a first representative signal representative of said selection signal while said first sampling circuit is in a default state and comprising an override signal while said first sampling circuit is in an override state, the output of said first sampling circuit comprising a first selection signal;

sampling with a second sampling circuit a second input signal, said second input signal comprising a representative signal representative of said selection signal while said second sampling circuit is in a default state and comprising an override signal while said second sampling circuit is in an override state, the output of said second sampling circuit comprising a second selection signal;

detecting at least two predetermined first edges of said first clock signal;

latching said first selection signal to said first input signal after said at least two predetermined first edges are detected;

detecting at least two predetermined second edges of said second clock signal;

latching said second selection signal to said second input signal after said at least two predetermined second edges are detected;

switching said first sampling circuit from the respective said default state to an override state when said second selection signal has an ON signal level;

switching said second sampling circuit from the respective said default state to an override state when said first selection signal has an ON signal level; and outputting as said output clock signal one of said first and said second clock signals when one of said first and second selection signals has an ON level and otherwise outputting a signal level which is prolongated with respect to said given pulse width.

9. The method according to claim 8, wherein said first representative signal comprises said selection signal, and wherein said second representative signal comprises an inverse of said selection signal.

10. The method according to claim 8, wherein an ON signal of said first selection signal and of said second selection signal is a low signal level.

11. The method according to claim 8, further comprising outputting a first gate signal comprising said first clock signal when said first selection signal has an ON signal level and an OFF signal level when said first selection signal has an OFF signal level; and outputting a second gate signal comprising said second clock signal when said second selection signal has an ON signal level and an OFF signal level when said second selection signal has an OFF signal level;

wherein said output clock signal is determined in accordance with said first and second gate signals.

12. An apparatus for producing an output clock signal, said apparatus comprising:

a first clock signal input for receiving a first clock signal having a given pulse width, a second clock signal input for receiving a second clock signal, having said given pulse width, a selection signal input for receiving a selection signal, said first and second clock signal and said selection signal being asynchronous in relation to each other, said selection signal further having an ON level and an OFF level, the ON level corresponding to the first clock signal being selected and the second clock signal not being selected, and the OFF level corresponding to the first clock signal not being selected and the second clock signal being selected, a first sampling circuit for sampling said selection signal at a first edge of said first clock signal and outputting a sampled signal as a first selection signal at a following edge of said first clock signal, said ON and OFF levels of said selection signal resulting in ON and OFF levels of said first selection signal, respectively, a second sampling circuit for sampling said selection signal at a first edge of said second clock signal and outputting a sampled signal as a second selection signal at a following edge of said second clock signal, said ON and OFF levels of said selection signal resulting in OFF and ON levels of said second selection signal, respectively, a first sampling control circuit for enabling and disabling said sampling of said selection signal by said first sampling circuit in response to said OFF and ON levels of said second selection signal, respectively, a second sampling control circuit for enabling and disabling said sampling of said selection signal by said second sampling circuit in response to said OFF and ON levels of said first selection signal, respectively, an output clock signal circuit for outputting as said output clock signal one of said first and second clock signals when one of said first and second selection signal has an ON level and otherwise outputting a signal level which is prolongated with respect to said given pulse width.

13. An apparatus for providing redundancy for an asynchronous output clock signal, said apparatus comprising:

a first clock signal input for receiving a first clock signal having a given pulse width, a second clock signal input for receiving a second clock signal having said given pulse width, said first and second clock signal being asynchronous in relation to each other, a selection signal input for receiving a selection signal, a clock selection circuit operated by said selection signal for selecting one of said first and second clock signals as said output clock signal, said clock selection circuit comprising a first pair of sequentially switched D-flip-flops for sampling said selection signal at two successive rising and falling edges of said first asynchronous clock signal to generate a first sample signal, a second pair of sequentially switched D-flip-flops for sampling said selection signal at two successive rising and falling edges of said second asynchronous clock signal to generate a second sample signal, said first and second sample signals being fed back to control said second and first pairs of D-flip-flops, respectively, the feeding back of said first and second sample signals serving to disable switching said output clock signal to comprise a new one of said asynchronous clock signals in response to a change in state of said selection signal until the state of one of said first and second sample signals has changed, and an output clock signal circuit responsive to a change in state of one of said first and second sample signals, for prolongating the current state of said output clock signal with respect to said given pulse width before switching said output clock signal to said new one of said first and second clock signals.

* * * * *